(12) United States Patent
Uster

(10) Patent No.: US 8,076,595 B2
(45) Date of Patent: Dec. 13, 2011

(54) METHOD FOR TRANSMITTING MEASUREMENT VALUES IN A MULTI-MODULE FORCE-MEASURING DEVICE, MULTI-MODULE FORCE-MEASURING DEVICE, AND FORCE MEASURING MODULE

(75) Inventor: Markus Uster, Näniko (CH)

(73) Assignee: Mettler-Toledo AG, Greifensee (CH)

( * ) Notice: Subject to any disclaimer, the term of this patent is extended or adjusted under 35 U.S.C. 154(b) by 331 days.

(21) Appl. No.: 12/237,957

(22) Filed: Sep. 25, 2008

(65) Prior Publication Data
US 2009/0082996 A1 Mar. 26, 2009

(30) Foreign Application Priority Data

Sep. 25, 2007 (EP) .................................... 07117120

(51) Int. Cl.
*G01G 19/00* (2006.01)
(52) U.S. Cl. .................... 177/25.13; 340/666; 702/173; 700/3; 177/199
(58) Field of Classification Search .................. 340/666; 177/25.13, 199–200; 702/173–175, 57; 700/3
See application file for complete search history.

(56) References Cited

U.S. PATENT DOCUMENTS

| | | | | |
|---|---|---|---|---|
| 3,881,166 A | * | 4/1975 | Fort et al. ......................... | 367/79 |
| 4,535,401 A | * | 8/1985 | Penn ................................. | 700/3 |
| 5,004,058 A | * | 4/1991 | Langford et al. ............ | 177/25.13 |
| 6,112,162 A | | 8/2000 | Richards | |
| 6,263,380 B1 | * | 7/2001 | Tsuboi et al. ..................... | 710/4 |
| 6,639,156 B2 | * | 10/2003 | Luke et al. ................. | 177/25.13 |
| 6,833,514 B2 | * | 12/2004 | Gesuita et al. ............. | 177/25.18 |
| 6,919,516 B2 | * | 7/2005 | Frye et al. .................. | 177/25.13 |
| 7,211,748 B2 | * | 5/2007 | Lauke et al. .................. | 177/199 |
| 7,305,324 B2 | * | 12/2007 | Beshears et al. ............. | 702/173 |
| 7,330,766 B2 | * | 2/2008 | Kuwayama et al. .............. | 700/3 |
| 7,375,293 B2 | * | 5/2008 | Beshears et al. ........... | 177/25.13 |
| 7,620,506 B2 | * | 11/2009 | Kuwayama et al. ............ | 702/57 |
| 2001/0037903 A1 | * | 11/2001 | Breed et al. ................ | 177/25.13 |
| 2004/0026135 A1 | * | 2/2004 | Huitt et al. ................. | 177/210 R |
| 2006/0041394 A1 | | 2/2006 | Kuwayama et al. | |
| 2007/0067141 A1 | * | 3/2007 | Beshears et al. ............. | 702/173 |
| 2008/0087103 A1 | | 4/2008 | Laubstein et al. | |
| 2009/0082996 A1 | * | 3/2009 | Uster ............................ | 702/173 |
| 2010/0084199 A1 | * | 4/2010 | Bucher et al. .............. | 177/25.13 |
| 2010/0263940 A1 | * | 10/2010 | Klauer et al. ..................... | 177/1 |

* cited by examiner

*Primary Examiner* — Randy W Gibson
(74) *Attorney, Agent, or Firm* — Standley Law Group LLP

(57) ABSTRACT

A method and associated apparatus transmits measurement values in a multi-module force-measuring device, in particular a multi-module weighing device, with at least two force-measuring modules. Each of the force-measuring modules includes a force-measuring cell and a signal-processing unit. The signal-processing unit transmits the measurement values generated by the force-measuring cell by way of a signal line to a signal-evaluating unit. Under the method, each measurement value is converted into a bit sequence by the respective signal-processing unit. The first force-measuring module's bit sequence is transmitted to the signal-evaluating unit, and the bit sequences of the signal-processing unit of the further force-measuring modules are transmitted by way of the signal-processing unit of the first force-measuring module to the signal-evaluating unit.

23 Claims, 4 Drawing Sheets

METHOD FOR TRANSMITTING MEASUREMENT VALUES IN A MULTI-MODULE FORCE-MEASURING DEVICE, MULTI-MODULE FORCE-MEASURING DEVICE, AND FORCE MEASURING MODULE

CROSS-REFERENCE TO RELATED APPLICATIONS

This application claims a right of priority under 35 USC §119 from European patent application 07 11 7120.1, filed 25 Sep. 2007, the content of which is incorporated by reference as if fully recited herein.

TECHNICAL FIELD

The present invention relates to a method for transmitting the measurement values in a multi-module force-measuring device, particularly in a multi-module weighing device, and it further relates to a multi-module force-measuring device as well as a force-measuring module which is suitable for a multi-module device.

BACKGROUND OF THE ART

A multi-module force-measuring device, as the term is used herein, means a force-measuring device built according to a modular design, wherein at least two forces which are to be measured independently of each other are captured individually with at least two independent force-measuring modules. A multi-module weighing device is a special kind of multi-module force-measuring device, wherein the forces that are to be measured independently are represented by the respective weight forces of at least two independent weighing objects, the so-called weighing loads. The force-measuring modules are in this case referred to as weighing modules.

To measure the force that is acting on it, each of the force-measuring modules has an electromechanical force-measuring cell which functions as a converter for the quantity being measured, as it converts the input quantity, i.e. the force, into a corresponding electrical measurement signal. In a weighing module, the conversion of the measurement quantity occurs analogously by way of a so-called weighing cell which generates electrical measurement values that correspond to the weight force exerted by the weighing object.

The measurement signals of the individual force-measuring modules or individual weighing modules, as the case may be, are generally passed on to a signal-evaluating unit for their evaluation. The signal-evaluating unit is often configured as a central processing unit whereby the measurement results obtained from the measurement signals can be visually displayed, transmitted to a central computer, or directed to a system controller.

Typical applications of multi-module weighing devices are found in automated production- and test systems to weigh objects of a uniform nature. Such systems include in particular installations for the production and/or testing of small and relatively expensive components, for example in filling- and packaging machines for tablets, capsules or ampoules in the pharmaceutical industry, or in the checking of ball bearings in the machine industry. The weighing of uniform objects is a process in which a plurality of loads are being weighed individually, for example for the purpose of check-weighing, dosage-dispensing, or the filling of containers in a compact space.

Required characteristics for a multi-module force-measuring device of this kind are that the measuring modules have a high measurement accuracy, a high reproducibility and thus a high degree of stability, that they can be arranged in the most space-saving and compact way possible, and that the individual force-measuring modules are of the simplest and most cost-effective design possible.

A multi-module weighing device is described in U.S. Pat. No. 6,112,162, wherein the analog signals of the individual weighing cells are directed to a central switching device, a so-called multiplexer. Accordingly, the amplifier as well as the analog/digital converter can be used by the individual force-measuring modules during specific time intervals. However, in this arrangement the disturbance-sensitive measurement signals of the weighing cells are carried through connecting lines to the central signal-evaluating unit, where they pass through the switching device. As a consequence, disturbance effects resulting from the transmission of the signals or originating from the switching device can reduce the quality of the measurement signals. Accordingly, the achievable accuracy is limited and the device described in this reference is less suitable for applications requiring a high level of accuracy. Furthermore, this device allows measurement processes to be performed only at a relatively slow speed, because only after a measurement cycle of a first weighing cell has been completed can a subsequent measurement cycle with the next weighing cell be started.

Further, in an arrangement which is disclosed in German Patent 10 2005 025 534 B3, the electronic circuitry required for the operation of the weighing module is arranged directly below the weighing cell, i.e. in the lower part of the weighing module. The disturbances resulting from the transmission of the measurement signals can thereby be avoided. However, the drawbacks in this arrangement are the high costs resulting from the large amount of space required and from the multiple replication of the electronic circuitry, as well as the undesirable effects on the weighing cells which occur as a result of the heat developed in the electronic components. The problem with the heat generation is that the heat produced by the electronic circuits rises upward to the heat-sensitive weighing cells in accordance with the known principle of buoyancy and can thus compromise the accuracy and/or stability of the measuring device.

European published application 1 557 648 discloses a configuration, where a subordinate force measuring device (child) is connected to a superordinate force measuring device (parent) by a shared bus structure (e.g. RS485). However, the bus structure requires a suitable coordination of the communication (e.g. addresses and/or protocol), to ensure, that only one force measuring device at a time transmits data over the bus structure. This staggering produces a relative slow data transmission and the electronics required for controlling the communication leads to the previously described problems of increased heat generation and additional costs.

It is therefore the object to propose a method for transmitting the measurement values of a multi-module force-measuring device, in particular a multi-module weighing device, and to further propose a multi-module force-measuring device and a suitable force-measuring module, whereby a simple and cost-effective design and operation of the measurement device can be achieved which meets stringent requirements in regard to measurement speed, measurement accuracy, and stability.

SUMMARY

This task is solved by method, by a multi-module measuring device, and by a force-measuring module, which possess the features specified in the independent claims. Advantageously expanded embodiments are presented in the further, dependent claims.

The embodiments disclose a method and a device for transmitting the measurement values of a multi-module force-measuring device, in particular a multi-module weighing device, with at least two force-measuring modules, each of which comprises a force-measuring cell and a signal-processing unit which transmits the measurement values generated by the force-measuring cell by way of a signal-conducting line to a signal-evaluating unit. The measurement values of each force-measuring module are converted by its signal-processing unit into a bit sequence and the bit sequence of the signal-processing unit of the first force-measuring module is transmitted to the signal-evaluating unit and the bit sequence of the signal-processing unit of the at least one further force-measuring module is directly transmitted by way of an intermediate connector line to the signal-processing unit of the first force-measuring module, from where it is further transmitted to the signal-evaluating unit. This accomplishes the results that the measurement values of the force-measuring cell are brought into a form that is resistant to disturbance effects, that by converting the measurement values in the individual force-measuring modules a very high measuring speed can be achieved, that cost advantages are gained from the shorter lengths of the connecting lines, and that with the simple transfer of the measurement values between the signal-processing units the use of extensive, heat-generating electronic circuitry for the control of the communication can be avoided.

A bit sequence serves to store and/or transmit information, i.e. for example measurement values, as a series of units of defined electrical signal states which is typically represented by a series of zeroes and ones. Consequently, by converting the measurement values into a bit sequence, the sensitive and highly precise measurement signal of the force-measuring cell is converted into a robust form that resists extraneous interference and is thus well suited for the transmission and further processing.

Typically, in particular when high precision is required, the conversion of the measurement values into a bit sequence involves a very time-consuming process. Through the concept of performing this conversion process concurrently in all of the force-measuring modules, it is possible to achieve a high degree of parallel processing and thus a very fast measurement rate.

Furthermore, the measuring speed of the multi-module force-measuring device can be increased through a process of reading the entire group of bit sequences at high speed. This fast, serial read is made possible by the fact that the bit sequence is individually generated and made available in each force-measuring module, and the bit sequences of all of the force-measuring modules are transmitted together to the signal-evaluating unit. The signal-evaluating unit can subsequently process the received bit sequences further with a high throughput rate by using fast serial or parallel processes.

As the signal-processing units of the different force-measuring modules are directly connected to each other, they function like one single signal-processing unit. Accordingly, this obviates the need to use an expensive electronic arrangement for controlling the communication in the force-measuring modules. The heat generation in the individual force-measuring modules is thus reduced, and consequently the stability of the multi-module force-measuring device is enhanced.

Also, with the direct connection of the signal-processing units, the lengths of the connecting lines become shorter, which offers cost advantages. Further, since the expensive electronics, in particular the controller devices and arithmetic units for the evaluation of the measurement values, are bundled in the signal-evaluating unit, benefits are gained on the one hand in regard to costs, while on the other hand the measurement stability is enhanced as a result of the reduced heat generation in the force-measuring modules.

The term "line" as used herein encompasses electrical conductor lines of all kinds, such as single-conductor cables or multi-conductor cables, strands or wires, as well as the carrying of the electrical current through fixed devices such as grounding rails, housing enclosures and connecting braces which are suitable for transmitting electrical signals from the force-measuring modules to the signal-evaluating unit.

While the expensive electronic components such as the arithmetic unit, the regulating and controlling device are arranged in the signal-evaluating unit and can be used in common by all of the force-measuring modules, each of the force-measuring modules contains only a minimal electronic aggregate for the generation of the bit sequences. As the number of force-measuring modules is always larger than the number of signal-evaluating units, this concept leads to a simple and cost-effective layout of the entire multi-module force-measuring device.

In a preferred embodiment, each signal-processing unit receives by way of a first input the measurement values of the force-measuring cell and/or by way of a second input the bit sequence of the signal-processing unit of the at least one further force-measuring module. The single-processing unit is thus enabled to process bit sequences and the measurement values of the force-measuring cell on different channels in a simultaneous and/or a sequentially switched mode.

In a further embodiment, the signal-processing units of all of the further force-measuring modules are connected to each other in a chain-like arrangement, and the bit sequences from each of the further force-measuring modules are transmitted to the signal-processing unit of the respective neighboring force-measuring module that is arranged closer to the signal-evaluating unit. A very efficient signal transmission can thereby be achieved for all force-measuring modules.

In a further preferred embodiment, the bit sequences are synchronized by means of a clock signal which is preferably generated by the signal-evaluating unit und delivered to the force-measuring modules through at least one synchronization line, and/or they are passed on bit by bit and substantially simultaneously. Preferably, the signal-processing unit of the first force-measuring module and/or of the at least one further force-measuring module are connected to the signal-evaluating unit through a synchronization line. By performing the conversion in the individual force-measuring modules in a synchronized manner and/or bit by bit and in essence simultaneously, a very high degree of parallel processing is achieved and thus a very fast measurement rate.

In a further embodiment, the measurement values generated by each of the force-measuring cells are converted into a bit sequence by an analog/digital converter which is arranged in said force-measuring cell. The disturbance-sensitive measurement values of the force-measuring cell are thereby converted into a robust digital format and thus protected against possible loss of signal quality. Furthermore, the measurement values of the force-measuring cell can also be amplified and/or impedance-converted prior to the analog/digital conversion through an appropriate signal-conditioning in the force-measuring cell.

In a further preferred embodiment, the signal-processing unit comprises a shift register with two inputs, wherein the measurement values of the force-measuring cell which have been digitized by the analog/digital converter are entered at the first input, and the bit sequence of the signal-processing unit of the at least one further force-measuring module are entered at the second input. By using the shift registers, a simple and cost-effective design can be realized with commonly available standard products.

In a further embodiment, the bit sequence of each signal-processing unit, or of the shift-register if applicable, is combined with the bit sequence of the signal-processing unit of a neighboring force-measuring module, and this combined bit sequence is transmitted as a serial bit stream to the signal-evaluating unit or to the second input of the signal-processing unit of the at least one further force-measuring module. The individual shift registers are thereby practically combined into a single large shift register which ideally encompasses the shift registers of all force-measuring modules of the multi-module force-measuring device.

In a further embodiment, each of the analog/digital converters is controlled by a control signal of the signal-evaluating unit, wherein the control entails in particular the simultaneous starting of the analog/digital converters, and/or each of the analog/digital converters generates after the completion of the conversion process a status signal, in particular an indicator signal, which is transmitted to the signal-evaluating unit, possibly by way of a logic circuit. In this arrangement, the analog/digital converters of the first force-measuring module and/or the at least one further force-measuring module are connected by way of a status line and/or a control line to the signal-evaluating unit.

In a further embodiment, the signal-evaluating unit registers the end of the longest-lasting analog/digital conversion and then sends a clock signal for the transmission of the bit sequence and/or a control signal for a new, preferably simultaneous start of all analog/digital converters. Unnecessary waiting periods are thereby avoided and the measuring speed is increased. The waiting periods are caused by the need to allow a sufficient safety margin in the wait for the completion of the longest conversion processes.

In a further embodiment, a time interval during the operation of the multi-module force-measuring device is reserved in which measurements are performed and the transmission of the bit sequences is interrupted, and/or a time interval is reserved in which the measurement values are transmitted and the acquisition of measurement values is interrupted. This avoids interference between the different processes.

In a further embodiment, a time interval for the transmission of the measurement values is set to last until a predetermined pattern of the bit sequence appears in the signal-evaluating unit, in particular until a sequence of zeroes appears, and that the second input of the signal-processing unit of the last further force-measuring module is fed continuously with zero values. Thus, it also becomes possible to reliably recognize a non-configured change of the number of force-measuring modules. The transmission process is therefore very flexible in regard to the adding or removing of force-measuring modules.

In a further embodiment, the measurement values of further sensors, in particular the measurement values of a temperature sensor and/or an identification code, are transmitted by the signal-processing unit of at least one force-measuring module to the signal-evaluation unit in addition to the measurement values of the force measuring cell. This integrated solution allows the most diverse measurement values to be transmitted to the signal-evaluating unit in a problem-free and highly efficient manner.

In a further preferred embodiment, the signal-evaluating unit is to a large extent arranged with spatial separation and/or thermal isolation from the force-measuring cells of the respective force-measuring modules in order to avoid the transmission of disturbances from the signal-evaluating unit to the force-measuring cell.

In a further embodiment, the signal line or the intermediate connector line has a coupling which allows the signal-processing unit of the at least one further force-measuring module to be inserted into the multi-module force-measuring device. The coupling is preferably configured in such a way that a direct electrical connection through the juncture of the coupling parts can be interrupted and the open ends can be connected, respectively, to the second input terminal and the output terminal of the signal-processing unit of the force-measuring module that is to be inserted. In this way, force-measuring modules can be exchanged without a long down-time interval, ideally during operation of the force-measuring device. Particularly for applications in industrial systems this has the big advantage that interruptions in the operation of the entire system can be avoided or at least reduced to an absolute minimum.

The individual force-measuring modules can be arranged in any desired way, for example distributed in a row, over an area, or in a three-dimensional setup, in a random distribution pattern, in a ring-shaped layout, or an array. The term "array" as used here refers to a regular arrangement, for example a linear, one-dimensional lineup in a row, or a two-dimensional layout covering an area like a matrix. Also conceivable as an array is a three-dimensional arrangement in which a plurality of two dimensional arrangements are stacked in a plurality of layers on top of each other.

In a further preferred embodiment, the bit sequence is transmitted through the intermediate connector line is transmitted by unidirectional signal transmission and/or through a dedicated signal transmission line. Preferably, the intermediate connector line is a dedicated signal transmission line. This way, blockings and/or collisions during transmission are avoided and therefore a very high transmission speed can be achieved at a minimum level of energy consumption.

BRIEF DESCRIPTION OF THE DRAWINGS

Details of the embodiments of the force-measuring device, the force-measuring module and the method are presented in the detailed description and the drawings, where identical parts are identified by identical part numbers and wherein.

DETAILED DESCRIPTION

Figure 1:
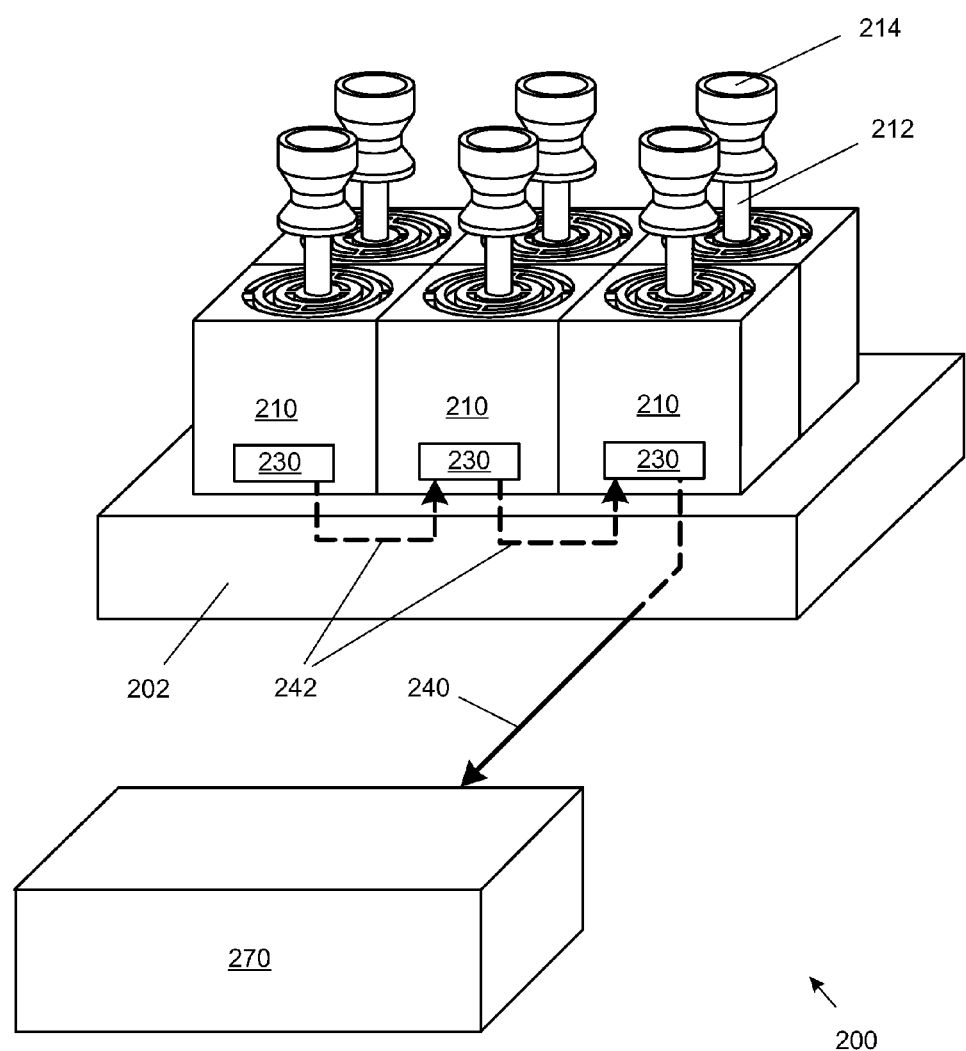
FIG. 1 is a perspective view of a multi-module force-measuring device with six force-measuring modules which are set up in an array and are connected to each other and to a signal-evaluating unit.

FIG. 1 illustrates in a perspective view a multi-module force-measuring device 200 with six force-measuring modules 210 which are set up in an array. Each of the force-measuring modules 210 includes a force-measuring cell (not shown in this drawing), which is installed in the interior of the force-measuring module 210 and is connected to a force-transmitting rod 212 leading to the outside. Originating from the force-measuring cell, the force-measuring rod 212 extends against the direction of the load, with a force-receiver 214 being attached to the end of each force-transmitting rod 212. The objects or loads to be weighed (not shown in the drawing) are normally disposed on top of the force-receivers 214.

Each force-measuring module 210 is attached to a receiving structure in the form of a base plate 202. The force-measuring modules 210 are releasably connected to the base plate 202 and, if necessary, they can be individually exchanged against force-measuring modules 210 of the same type, for example in a service case or if the force-measuring device 200 is to be adapted for another load range.

When a force is acting on the force-measuring cell of the first force-measuring module 210, the force-measuring cell generates a corresponding measurement value which is converted by a signal-processing unit 230 (not shown) of the first force-measuring module 210 into a bit sequence $B_1$. This bit sequence $B_1$ is then transmitted through the signal line 240 to the signal-evaluating unit 270.

Analogously, the signal-processing unit 230 of the second force-measuring module 210 converts the measurement values of the force-measuring cell into a corresponding second bit sequence $B_2$. The bit sequence $B_2$ of the second force-measuring module 210 is then transmitted through an intermediate connector line 242 to the signal-processing unit 230 of the first force-measuring module 210 and from there to the signal-evaluating unit 270.

In this embodiment, the six force-measuring modules 210 are connected to each other in a chain-like arrangement, in which the respective bit sequence $B_2, \ldots, B_6$ of the signal processing unit 230 of the second to sixth force-measuring module 210 is passed along through an intermediate connector line 242 to the signal-processing unit 230 of the respective neighboring force-measuring module 210. The respective bit sequence $B_2, \ldots, B_6$ of the second to sixth force measuring module 210 thus passes through a certain number of intermediate stages to get to the signal-processing unit 230 of the first force-measuring module 210 and from there through the signal line 240 to the signal-evaluating unit 270.

The afore-described principle of forwarding the bit sequences $B_1, \ldots, B_n$ can be expanded analogously into a multi-module force-measuring device 200 with any desired number of force-measuring modules 210, in particular a number of n force-measuring modules 210, wherein n is a positive integer equal to or larger than 2.

The signal-evaluating unit 270 is arranged at some distance from the force-measuring modules 210 in order to avoid mutual interference between the electronic circuits of the signal-evaluating unit 270 and the force-measuring modules 210. This interference can manifest itself in many ways, for example as electromagnetic fields, heat radiation, thermal convection, or mechanical disturbances.

The signals transmitted through the signal line 240 are evaluated and/or appropriately transformed in the signal-evaluating unit 270. The results of the evaluation can be passed on in many ways different ways for further processing, for example to an indicator device, a system controller, or a central computer.

Figure 2:
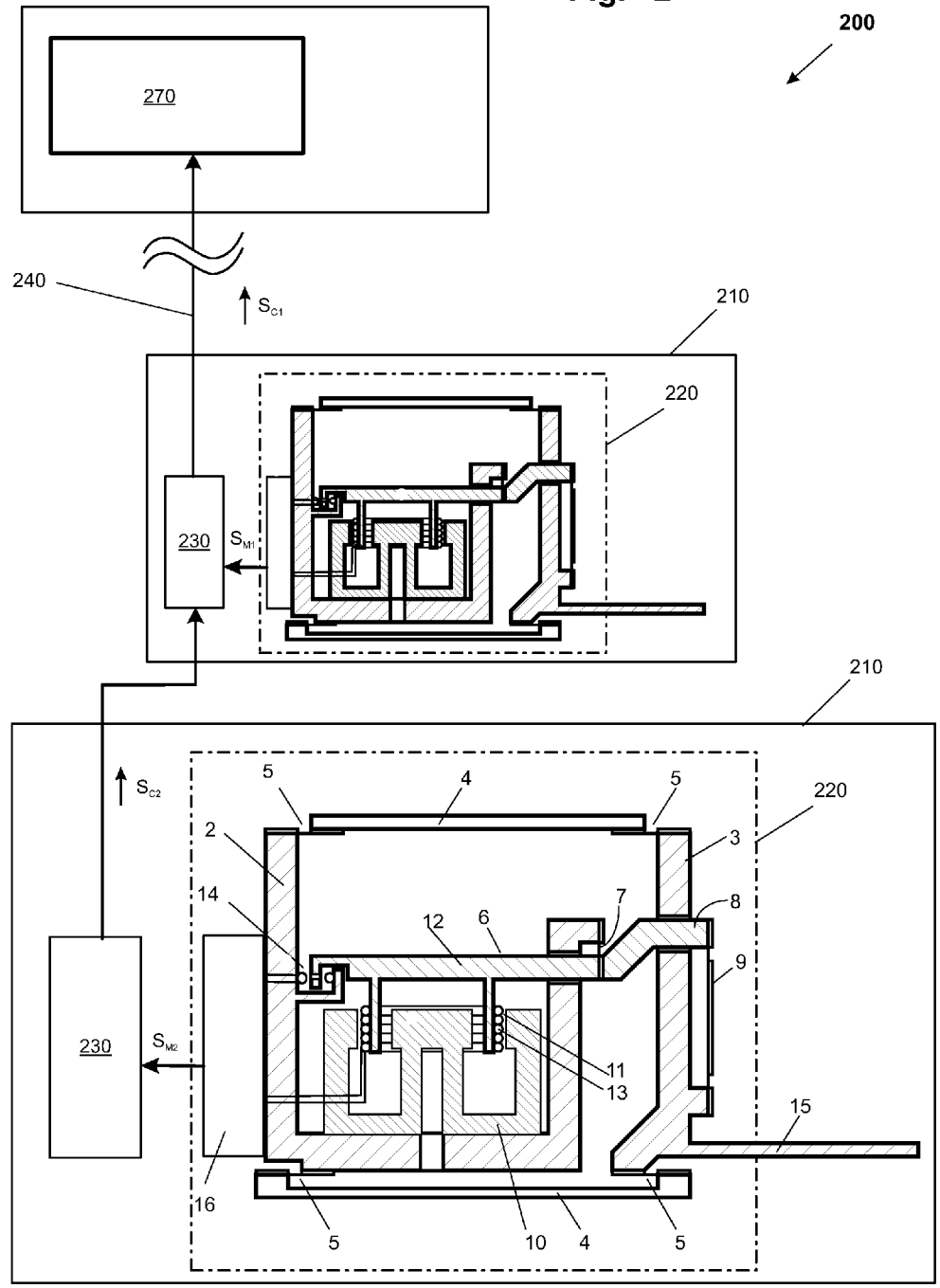
FIG. 2 illustrates the principle of a multi-module force-measuring device of FIG. 1, with two force-measuring modules shown in sectional view, which obtain the measurement values according to the principle of electromagnetic force compensation and are equipped with a signal-processing unit to generate bit sequences, wherein the bit sequence of the second force-measuring module is transmitted by way of the signal-processing unit of the first force-measuring module to the signal-evaluating unit.

In a strongly simplified representation, FIG. 2 illustrates the principle of a multi-module force-measuring device 200 of the kind shown in FIG. 1. The force-measuring modules 210 in this example are based on the principle of electromagnetic force compensation and are therefore particularly well suited for use in weighing systems, especially for high-precision weighing.

The force-measuring module 210 includes a force-measuring cell 220 which, in turn, includes a force-transmitting mechanism with a parallel-guiding linkage that has a stationary part 2 and a vertically movable part 3 constrained to each other by a pair of guide members 4 with flexure pivots 5 at their ends. The vertically movable part 3 includes a cantilevered support arm 15 serving to receive a load that is to be measured. The normal component of the force exerted by a load is transmitted from the vertically movable part 3 through a coupler element 9 to the short lever arm 8 of the lever 6. The lever 6 is suspended by means of a flexure fulcrum 7 on a portion of the stationary part 2. The force-measuring cell further includes a cup-shaped permanent magnet system 10 which is arranged in rigid connection with the stationary part 2 and includes an air gap 11. A coil 13 which is connected to the longer lever arm 12 of the lever 6 is arranged in the air gap 11. Flowing through the coil 13 is a compensating electrical current, whose magnitude depends on the force acting on the lever 6. The position of the lever 6 is measured by an opto-electrical position transducer 14 which is connected to a feedback control device 16 regulating the compensating current in response to the signal of the opto-electrical position transducer 14 in such a way that the lever 6 is always held in the same position or, after a change of the load, is returned to the same position. This principle of force compensation allows a very high measurement accuracy to be achieved, which is of special advantage in particular for the weighing of the smallest substance quantities.

Furthermore, the force-measuring module can also be configured as a direct-acting force-measuring device. In this case, the force-transmitting lever 6 is omitted, and the coil 13 is connected directly to the force-transmitting rod 212 which leads to the outside. The compensating current is regulated in such a way that the compensating force counteracts the load acting on the force-transmitting rod, so that the force-transmitting rod is held in a constant position.

Figure 3:
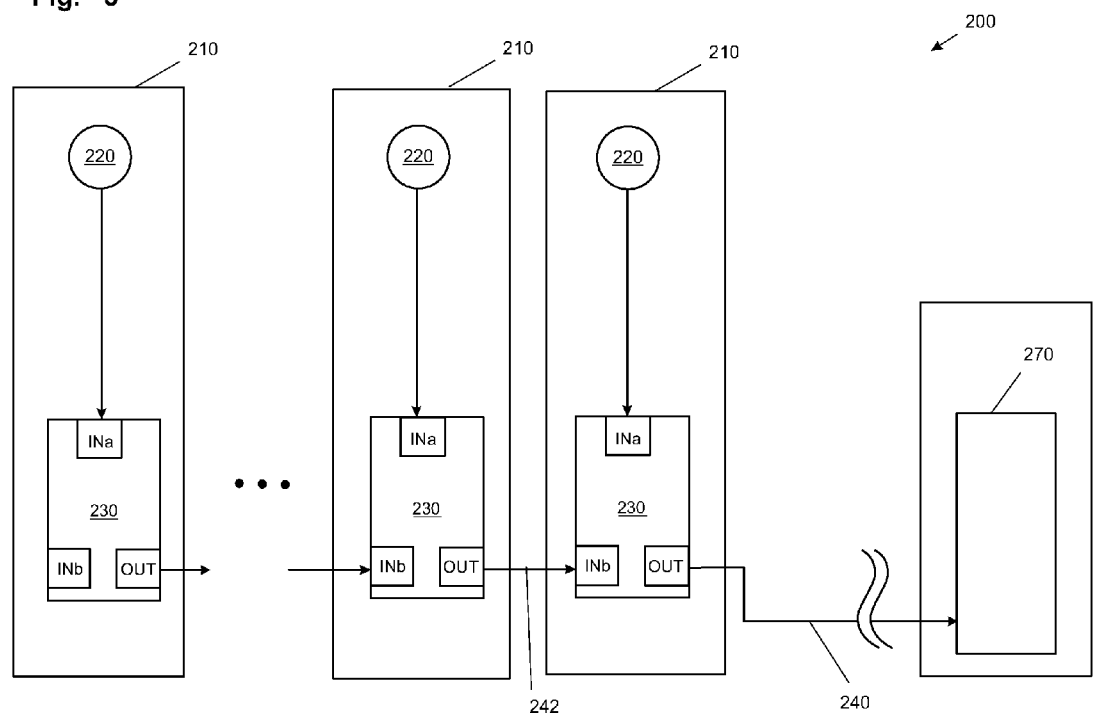
FIG. 3 is a simplified circuit schematic of a multi-module force-measuring device of FIG. 2, but with a large number n of force-measuring modules with their associated signal-processing units, each of which has two inputs and an output.

FIG. 3 shows a simplified circuit schematic of a multi-module force-measuring device 200 with n force-measuring modules 210, each of which includes a signal-processing device 230 serving to generate bit sequences $B_1, \ldots, B_n$. The index n stands for an arbitrary positive integer which is larger than or equal to 2. With preference, all of the force-measuring modules 210 are of identical design and can be exchanged in any way desired.

Each of the signal-processing units 230 has a first input Ina, a second input INb, and an output OUT. The first input Ina is connected to the respective force-measuring cell 220, so that the measurement values of the force-measuring cell 220 can be transmitted to the signal-processing unit 230. The output OUT of the first signal-processing unit 230 is connected by way of a signal line to the signal-evaluating unit 270, whereby the bit sequence $B_1$ generated by the signal-processing unit 230 of the first force-measuring module 210 can be transmitted.

The second input INb of the first signal-processing unit 230 is connected by way of an intermediate connector line 242 to the output of a signal-processing unit 230 of a second force-measuring module 210. Along this path, the bit sequence $B_2$ of the signal-processing unit 230 of the second force-measuring module 210 can be transmitted to the signal-processing unit of the first force-measuring module 210. In the signal-processing unit 230 of the first force-measuring module 210, the bit sequence $B_2$ of the signal-processing unit 230 of the second force-measuring module 210 is combined with the bit sequence $B_1$ of the signal-processing unit 230 of the first force-measuring module 210 into a combined bit sequence $B_1$.

Analogously, the further force-measuring modules 210 are connected to each other in a chain-like arrangement, so that the bit sequence $B_n$ of the signal-processing unit 230 of the last force-measuring module 210 is transmitted to the signal-evaluating unit 270 by way of the signal-processing units 230 of any desired number of force-measuring modules 210 connected in between.

Figure 4:
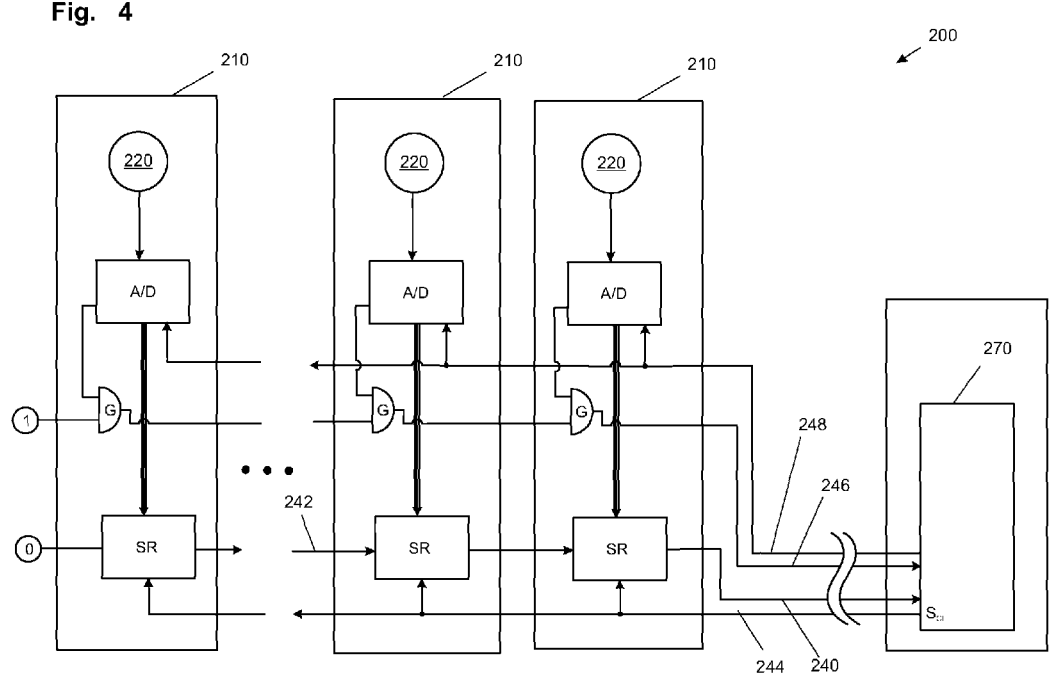
FIG. 4 is a strongly simplified view of the principle of a multi-module force-measuring device of FIG. 3, with signal-processing units having an analog/digital converter, a shift register (SR) and a logic element (G).

FIG. 4 illustrates a simplified circuit schematic of a multi-module force-measuring device 200 according to FIG. 3 with n force-measuring modules 210, each of which has an analog/digital converter A/D and a shift register SR serving to generate bit sequences $B_1, \ldots, B_n$. In this case, too, all force-measuring modules 210 are preferably of identical design and arbitrarily exchangeable.

The multi-module force-measuring device 200 additionally includes a synchronization line 244 which connects the respective signal-processing units 230 of the force-measuring modules 210 to the signal-evaluating unit 270. By way of this synchronization line 244, a clock signal $S_{CL}$ generated in the signal-evaluating unit 270 is passed along to the signal-processing units 230 of the individual force-measuring modules 210.

Each clock pulse of the clock signal $S_{CL}$ has the effect that the bit sequence of the shift registers is shifted by one bit position. In this process, the bit at the output of a shift register SR is transmitted through the intermediate connector line 242 to the second input of the shift register SR of the neighboring force-measuring module 210, with the shift register SR of the first force-measuring module 210 being the exception where the bit at the output is transmitted to the signal-evaluating unit 270. Furthermore, a zero value (0) is entered at the second input of the shift register SR of the last force-measuring module 210.

This process is repeated until the bit sequences of all force-measuring modules 210 have been transmitted bit-by-bit to the signal-evaluating unit 270. This can be achieved on the one hand through an arrangement where an exactly predefined number of clock pulses are delivered into the synchronization line 244, or on the other hand through an arrangement where clock pulses 244 are sent to the synchronization line until a predetermined bit pattern, in this case a series of zero values (0), appears at the input of the signal-evaluating unit.

The multi-module force-measuring device 200 further includes a control line 248 through which the analog/digital converter A/D of each force-measuring module 210 is connected to the signal-evaluating unit 270. By way of this control line 248, the analog/digital converters A/D can be started from the signal-evaluating unit 270 simultaneously by way of an appropriate control signal.

The multi-module force-measuring device 200 further includes a status line 246 which is connected on the one hand to the signal-evaluating unit 270 and on the other hand to the analog/digital converter A/D in each force-measuring module 210 by way of a respective logic element G. As soon as the analog/digital converter A/D has completed it conversion process, it will signal this event to the associated logic element G, in this case by a logic value of one (1). The logic element G is configured in this case as an AND gate which ties the signal of the analog/digital converter A/D together with the signal of the status line 246 of the neighboring force-measuring module 210 by way of an AND operation. In cases where the analog/digital converter of a force-measuring module 210 as well as the analog/digital converter of the preceding force-measuring module 210 signal the completion of their respective conversion processes, a corresponding logic signal one is passed on to the next-following force-measuring module 210 or to the signal-evaluating unit 270. At the logic element of the last force-measuring module 210, a constant value of one (1) is entered. The status line 246 with the corresponding logic elements G has the effect that the end of the last-completed conversion process is signaled to the signal-evaluating unit 270.

The measurement method can be operated in synchronous or asynchronous mode. In the synchronous mode, all analog/digital converters A/D are started simultaneously, and the measurement values are collected after a predefined time interval. Preferably, the time interval is made sufficiently long so that all analog/digital converters A/D have completed their respective conversion processes and have transferred the corresponding bit sequence to the shift register SR. In this case, the status line 246 and the logic gate G are not needed.

In the asynchronous mode, the completion of the last conversion process is signaled to the signal-evaluating unit 270 by way of the status line 246. Next, the signal-evaluating unit 270 can immediately continue with collecting the bit sequences and subsequently restarting the analog/digital converters A/D. With this asynchronous mode, unproductive dead time intervals are avoided, and the measurement speed of the measurement method and the multi-module force-measuring devices 200 can be significantly increased.

As in the examples described previously, the principle can also in this case be expanded analogously into a multi-module force-measuring device 200 with any desired number of force-measuring modules 210.

What is claimed is:

1. A method for transmitting measurement values in a multi-module force-measuring device with at least two force-measuring modules, each of which comprises a force-measuring cell and a signal-processing unit which transmits the measurement values generated by the force-measuring cell by way of a signal line to a signal-evaluating unit, comprising the steps of:
   converting the measurement values of each force-measuring module in the associated signal-processing unit into a bit sequence;
   transmitting the bit sequence of the first force-measuring module to the signal-evaluating unit; and
   transmitting the bit sequence of each subsequent force-measuring module by an intermediate connector line to the signal-processing unit of the first force-measuring module, and, from there, to the signal-evaluating unit.

2. The method of claim 1, wherein:
   the step of converting measurement values occurs in the associated signal processing unit, using measurement values received in a first input thereof; and
   the step of transmitting bit sequences through the signal processing unit occurs for bit sequences received in a second input thereof.

3. The method of claim 1, wherein:
   the step of transmitting bit sequences through the signal-processing units of the force-measuring modules occurs by transmitting all received bit sequences to the neighboring force-measuring module that is arranged closer to the signal-evaluating unit, the force-measuring modules being linked in a chained manner.

4. The method of claim 3, further comprising the step of at least one of:
synchronizing the bit sequences using a clock signal delivered to the force-measuring modules through at least one synchronization line; and
passing the bit sequences on bit by bit in a substantially simultaneous manner.

5. The method of claim 1, wherein:
the converting step occurs by way of an analog/digital converter arranged in the force-measuring cell.

6. The method of claim 5, wherein:
each signal-processing unit comprises a shift register with two inputs, the measurement values of the force-measuring cell which have been digitized by the analog/digital converter entering at the first input, and the bit sequences received from a further force-measuring module entering at the second input.

7. The method of claim 6, wherein:
the bit sequence transmitted in the transmitting step is a combined bit sequence formed by combining the bit sequence resulting from converting the measurement value and the bit sequence received from the neighboring force-measuring module, with the combined bit sequence being transmitted as a serial bit stream.

8. The method of claim 7, wherein:
the converting step in the analog/digital converters (A/D) is controlled by the transmitting of at least one of:
a control signal of the signal-evaluating unit, wherein the control entails in particular the simultaneous starting of the analog/digital converters, and
a status signal generated by each of the analog/digital converters after the completion of the converting step process, the status signal being transmitted to the signal-evaluating unit.

9. The method of claim 8, comprising the steps of:
registering the end of the longest-lasting analog/digital conversion in the signal-evaluating unit; and
sending at least one of
a clock signal for the transmission of the bit sequence; and
a control signal for a new start of all analog/digital converters.

10. The method of claim 1, further comprising at least one of the steps of:
reserving a time interval during the operation of the multi-module force-measuring device for acquiring measurement values, during which the transmitting of the bit sequences is interrupted, or
reserving a time interval in which bit sequences are transmitted and the acquiring of measurement values is interrupted.

11. The method of claim 1, wherein:
the time interval for transmitting the measurement values is set to last until a predetermined pattern of the bit sequence appears in the signal-evaluating unit; and
that the second input of the signal-processing unit of the last further force-measuring module is continuously fed with the predetermined pattern.

12. The method of claim 1, further comprising the step of:
transmitting the measurement values of at least one further non-force-measuring sensor to the signal-evaluation unit in addition to the measurement values of the force measuring cell by the signal-processing unit of at least one force-measuring module.

13. A multi-module force-measuring device-comprising:
a base plate;
a first, and at least one further, force-measuring module, each force measuring module releasably connected to the base plate in an array and comprising:
a force-measuring cell; and
an associated signal-processing unit having an input connected to the force-measuring cell and an output, each signal-processing unit operable to convert measurement values received from the force-measuring cell into a bit sequence;
a signal-evaluating unit;
a signal line, directly connecting the signal-evaluating unit to the signal-processing unit output of the first force-measuring unit and indirectly connecting the signal-evaluating unit through the signal line to the signal-processing unit output of each further force-measuring unit; and
an additional input on the signal-processing unit of the first force-measuring module, the additional input connected through an intermediate connector line to the signal processing unit output of one of the at least one further force-measuring modules.

14. The device of claim 13, wherein:
each signal-processing unit of each further force-measuring module comprises two inputs, the first input connected to the force-measuring cell and the second input connected through the intermediate connector line to the signal-processing unit output of another force-measuring module.

15. The device of claim 13, wherein:
the signal-processing units of all of the further force-measuring modules are linked in a chained manner such that the bit sequence of each is transmitted to the signal-evaluating unit through the signal-processing unit of each force-measuring module that is located closer to the signal-evaluating unit.

16. The device of claim 13, wherein:
each signal-processing unit comprises one of:
an analog/digital converter connected to the associated force-measuring cell and operable to generate the bit sequence; or
a shift register with two inputs, the first input being connected to an analog/digital converter connected to the associated force-measuring cell and operable to generate the bit sequence and the second input being connected to the signal processing unit output of one of the further force-measuring modules.

17. The device of claim 16, wherein:
the output of the signal-processing unit, or of the shift register if applicable, is connected to the signal-evaluating unit for the purpose of transmitting a serial bit stream, or is connected to the second input of the signal-processing unit of the at least one further force-measuring module.

18. The device of claim 16, further comprising:
a control line through which the signal-processing units are connected to the signal-evaluating unit; and
a common status line through which the analog/digital converters are connected to the signal-evaluating unit.

19. The device of claim 16, wherein:
the signal-evaluating unit is arranged, relative to the force-measuring cells of the respective force-measuring modules, to be at least one of: spatially separated and thermally isolated therefrom.

20. The device of claim 13, further comprising:
a coupling for inserting the signal-processing unit of the at least one further force-measuring module into the multi-module force-measuring device, the coupling configured for a direct electrical connection through the juncture of the coupling parts which can be interrupted and connections can be established, respectively, to the second input and to the output of the signal-processing unit of the force-measuring module in which it is inserted, the coupling being a part of at least one of the signal line and the intermediate connector line.

21. The method of claim 1, wherein:
the step of transmitting the bit sequence through the intermediate connector line occurs by at least one of unidirectional transmission, synchronous transmission and transmission through a dedicated signal transmission line.

22. The device of claim 13, wherein:
the intermediate connector line is configured as a dedicated signal transmission line.

23. A force-measuring module for a multi-module force-measuring device, comprising:
a force-measuring cell; and
an associated signal-processing unit with two inputs and an output, the first input connected to the force-measuring cell, the second input intended for direct connection to an output of the signal-processing unit of a further force-measuring module, with the signal-processing unit operable to convert measurement values received from the force-measuring cell into a bit sequence for transfer through the output.

* * * * *